United States Patent
Peterman et al.

(10) Patent No.: US 6,843,360 B2
(45) Date of Patent: Jan. 18, 2005

(54) RETRACTABLE TRANSFER DEVICE METERING APPARATUS AND METHODS

(75) Inventors: Thomas Harold Peterman, Alexandria, MN (US); Daniel Leonard Floding, Alexandria, MN (US); Irvan Leo Pazdernik, Alexandria, MN (US); Richard Jerome Schoeneck, Alexandria, MN (US); Paul Howard Wagner, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 0 days.

(21) Appl. No.: 10/108,168

(22) Filed: Mar. 27, 2002

(65) Prior Publication Data

US 2003/0183484 A1 Oct. 2, 2003

(51) Int. Cl.⁷ .............................................. B65G 47/26
(52) U.S. Cl. ................. 198/429; 198/418.6; 198/460.2; 198/600
(58) Field of Search .............................. 198/418.6, 426, 198/429, 460.2, 600; 53/147, 532

(56) References Cited

U.S. PATENT DOCUMENTS

| | | |
|---|---|---|
| 1,874,669 A | 8/1932 | Wagner |
| 2,050,547 A | 8/1936 | Thayer |
| 2,678,151 A | 5/1954 | Geisler |
| 2,756,553 A | 7/1956 | Ferguson et al. |
| 2,918,765 A | 12/1959 | Currivan |
| 2,971,309 A | 2/1961 | Miskel et al. |
| 3,108,679 A | * 10/1963 | Woody ................... 198/468.6 |
| 3,201,912 A | 8/1965 | Wozniak |
| 3,210,904 A | 10/1965 | Banks |
| 3,323,281 A | 6/1967 | Talbot |
| 3,444,980 A | 5/1969 | Wiseman |
| 3,483,668 A | 12/1969 | Frost et al. |
| 3,513,623 A | 5/1970 | Pearson |
| 3,524,295 A | 8/1970 | Spaulding |
| 3,555,770 A | 1/1971 | Rowekamp |
| 3,579,956 A | 5/1971 | Hoffmann et al. |
| 3,645,068 A | 2/1972 | Langen |
| 3,660,961 A | 5/1972 | Ganz |
| 3,767,027 A | 10/1973 | Pund et al. |
| 3,778,959 A | 12/1973 | Langen et al. |
| 3,805,476 A | 4/1974 | Kawamura et al. |
| 3,826,058 A | 7/1974 | Preisig |

(List continued on next page.)

FOREIGN PATENT DOCUMENTS

| | | | |
|---|---|---|---|
| DE | 1247216 | 8/1967 | ......... B65G/81/129 |
| EP | 0659664 A1 | 6/1995 | ........... B65G/47/08 |
| JP | 1162621 | 6/1989 | |
| JP | 05170332 A | * 7/1993 | ........... B65G/47/52 |

OTHER PUBLICATIONS

US 5,457,940, 10/1995, Ziegler et al. (withdrawn)

*Primary Examiner*—Kathy Matecki
*Assistant Examiner*—Mark A. Deuble
(74) *Attorney, Agent, or Firm*—Alan D. Kamrath; Nikolai & Mersereau, P.A.

(57) ABSTRACT

Product is conveyed as a continuous stream by a meter conveyor (12) unto a transfer plate (32) and a transfer device (42). The transfer device (42) is movable between a retracted position and an extended position extending over a sweep conveyor (22). In a preferred form, the transfer device (42) is in the form of a thin piece of flexible material and is moved in the conveying direction from the retracted position to the extended position by engaging with the sweep conveyor (22) and is moved to the retracted position by being wrapped around a rotated roller (46). Product is transferred from the transfer device (42) to the sweep conveyor (22) as the transfer device (42) moves from the extended position to the retracted position and is engaged by a metering bar (52ba) which controls the product acceleration on the sweep conveyor (22) to match the meter conveyor (12) until the product group leaves the transfer device (42). With nested product, the leading edge of the transfer device (42) is scalloped to represent the product bottom leading edge.

20 Claims, 2 Drawing Sheets

U.S. PATENT DOCUMENTS

| | | | |
|---|---|---|---|
| 3,938,650 A | | 2/1976 | Holt |
| 3,941,236 A | | 3/1976 | Hagedorn |
| 3,956,868 A | | 5/1976 | Ganz et al. |
| 3,979,878 A | | 9/1976 | Berney |
| 4,041,677 A | | 8/1977 | Reid |
| 4,237,673 A | | 12/1980 | Calvert et al. |
| 4,385,482 A | | 5/1983 | Booth |
| 4,421,229 A | | 12/1983 | Pan et al. |
| 4,469,219 A | * | 9/1984 | Cosse ............... 198/460.2 |
| 4,479,574 A | | 10/1984 | Julius et al. |
| 4,555,892 A | | 12/1985 | Dijkman |
| 4,566,248 A | | 1/1986 | Cooley |
| 4,611,705 A | | 9/1986 | Fluck |
| 4,642,927 A | | 2/1987 | Zamacola |
| 4,768,329 A | | 9/1988 | Borrow |
| 4,802,324 A | | 2/1989 | Everson |
| 4,815,251 A | | 3/1989 | Goodman |
| 4,844,234 A | | 7/1989 | Born et al. |
| 4,887,414 A | | 12/1989 | Arena |
| 4,895,245 A | | 1/1990 | Bauers et al. |
| 4,936,077 A | | 6/1990 | Langen et al. |
| 4,961,488 A | * | 10/1990 | Steeghs ............... 198/357 |
| 4,962,625 A | | 10/1990 | Johnson, Jr. et al. |
| 5,012,916 A | | 5/1991 | Cruver |
| 5,036,644 A | | 8/1991 | Lashyro et al. |
| 5,070,992 A | | 12/1991 | Bonkowski |
| 5,237,795 A | | 8/1993 | Cheney et al. |
| 5,241,806 A | | 9/1993 | Ziegler et al. |
| 5,347,796 A | | 9/1994 | Ziegler et al. |
| 5,437,143 A | | 8/1995 | Culpepper et al. |
| 5,456,058 A | | 10/1995 | Ziegler |
| 5,469,687 A | | 11/1995 | Olson |
| 5,477,655 A | | 12/1995 | Hawley |
| 5,546,734 A | | 8/1996 | Moncrief et al. |
| 5,579,895 A | | 12/1996 | Davis, Jr. et al. |
| 5,630,311 A | | 5/1997 | Flix |
| 5,638,663 A | | 6/1997 | Robinson et al. |
| 5,666,789 A | | 9/1997 | Ziegler |
| 5,667,055 A | | 9/1997 | Gambetti ............... 198/419.3 |
| 5,727,365 A | | 3/1998 | Lashyro et al. |
| 5,755,075 A | | 5/1998 | Culpepper |
| 5,765,336 A | | 6/1998 | Neagle et al. |
| 5,778,634 A | | 7/1998 | Weaver et al. |
| 6,058,679 A | | 5/2000 | Ziegler et al. |
| 6,202,827 B1 | | 3/2001 | Drewitz |

* cited by examiner

RETRACTABLE TRANSFER DEVICE METERING APPARATUS AND METHODS

BACKGROUND

The present invention generally relates to apparatus and methods for metering product from a continuous stream into a product group and/or pack pattern, particularly to metering apparatus and methods not requiring windows between product in the continuous stream, more particularly to metering apparatus and methods which are versatile to meter a wide variety of product such as cans, plastic bottles, jars, cartons, bundles, or trays, and specifically to metering apparatus and methods where product is metered by moving a transfer device from underneath a product group positioned above a sweeping conveyor.

In a typical packaging operation, product comes to a packaging machine in a continuous stream. It is necessary to separate product into groups so that they can be further processed such as being placed into a pack pattern and/or packed into a film overwrap or a corrugated wrap. U.S. Pat. Nos. 4,832,178 and 5,201,823 represent one manner of metering product utilizing pins which are inserted between product in lanes. However, it should be appreciated that such pin metering apparatus can only be utilized for product presenting windows between product. Additionally, such pin metering apparatus includes pins, rails, and supports between each lane of product which are multiple, high wear, moveable components and are very difficult and expensive to change over between different products. Other metering designs which control product from the side or top also require many parts, are complex, and are difficult to adjust.

Thus, a need continues to exist for apparatus and methods for metering product which do not suffer from the deficiencies of prior metering apparatus, especially those of prior pin metering apparatus. In particular, such apparatus and methods should be versatile enough to meter a range of product sizes and shapes including product which does not have windows between abutting product and can be changed over between different product sizes and shapes with minimum effort or expense, which is relatively low wear and maintenance, and which is relatively trouble free.

SUMMARY

The present invention solves this need and other problems in the field of metering apparatus and methods by providing, in most preferred aspects, a transfer device upon which product is transferred while in an extended position extending over a product conveyance mechanism. The product is removed from the transfer device when the transfer device is moved to a retracted position from beneath the product which is prevented from moving with the transfer device to the retracted position such as by abutting with the remaining product in a continuous stream being advanced towards the transfer device.

In most preferred forms, the transfer device is in the form of a thin piece of flexible material which engages and is pulled by the product conveyance mechanism from its retracted position to its extended position and is wrapped around a rotatable roller to move from its extended position to its retracted position. In most preferred forms, the transfer device is in the form of a piece of material having a leading edge which is scalloped to represent the nonlinearly straight, lead bottom edge of product being transferred.

In other preferred aspects, the lead product is abutted as it is transferred unto a product conveyance mechanism by a metering bar which is moving at a speed equal to the product before it is transferred unto the product conveyance mechanism and less than the speed of the product conveyance mechanism until the entire product group is transferred on the product conveyance mechanism to thereby retain the product in the group while it is being transferred to the product conveyance mechanism.

It is thus an object of the present invention to provide novel apparatus and methods for metering product.

It is further an object of the present invention to provide such novel metering apparatus and methods not requiring the presentation of windows between abutting product.

It is further an object of the present invention to provide such novel metering apparatus and methods versatile enough to meter product of different sizes and shapes including but not limited to cans, bottles, jars, cartons, bundles and trays.

It is further an object of the present invention to provide such novel metering apparatus and methods which can be easily changed over between different product and/or different product group sizes.

It is further an object of the present invention to provide such novel metering apparatus and methods allowing nesting of products in the continuous stream of product to minimize product surge.

It is further an object of the present invention to provide such novel metering apparatus and methods minimizing the number and complexity of components, with few high wear components.

It is further an object of the present invention to provide such novel metering apparatus and methods which eliminate or control physical registration forces during the metering operation.

It is further an object of the present invention to provide such novel metering apparatus and methods allowing easy access to the product from the top and side and to the bottom of the apparatus for maintenance and cleaning.

It is further an object of the present invention to provide such novel metering apparatus and methods providing an easy manner of retaining product as a group by controlling the acceleration of product on the product conveyance mechanism.

It is further an object of the present invention to provide a novel transfer device including a scalloped leading edge for use in such novel metering apparatus and methods.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
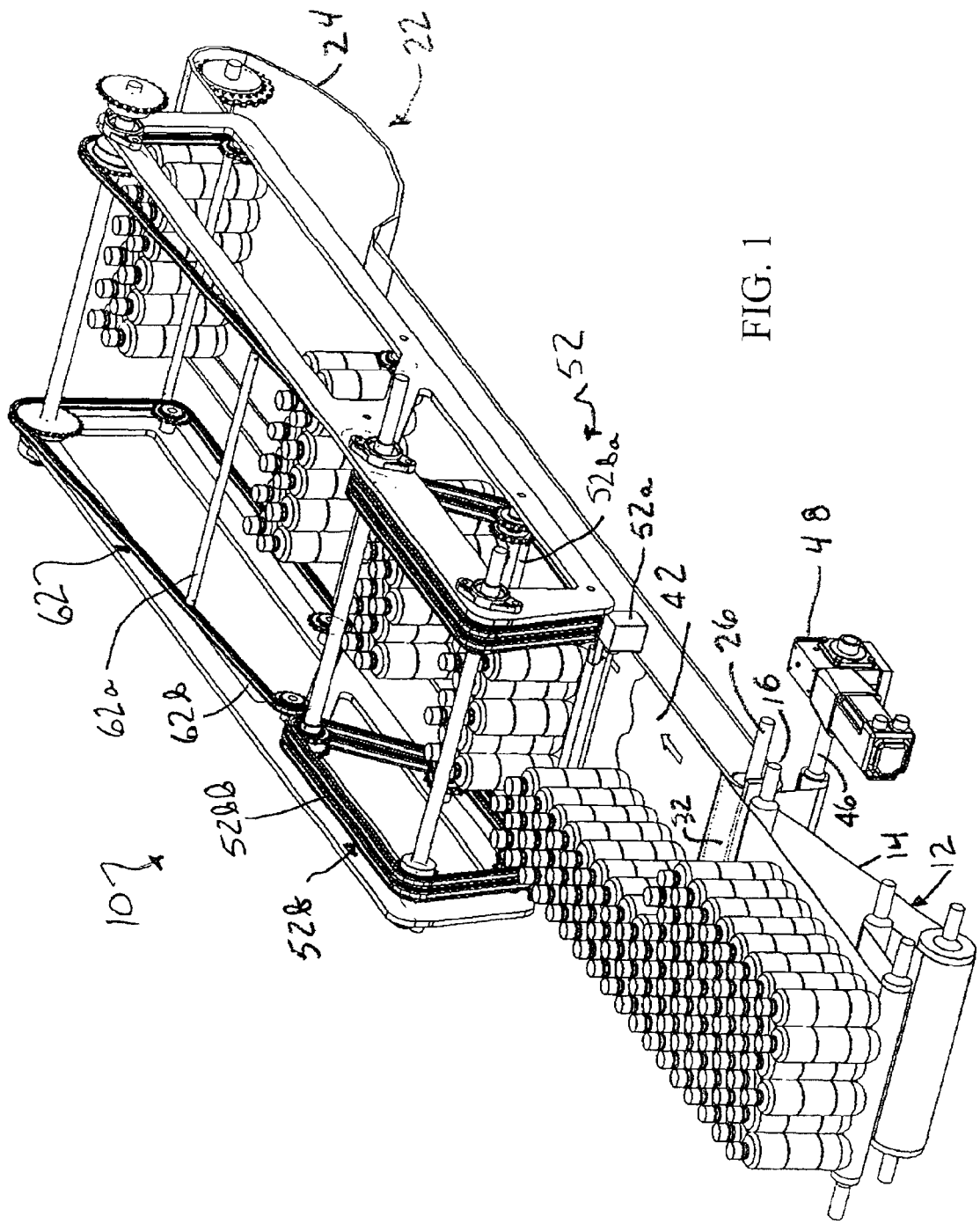
FIGS. 1 and 2 show partial, perspective views of a metering apparatus utilizing preferred methods according to the preferred teachings of the present invention, with portions and product being removed to show constructional details, with the transfer device being in its extended position and retracted position, respectively.
Figure 2:
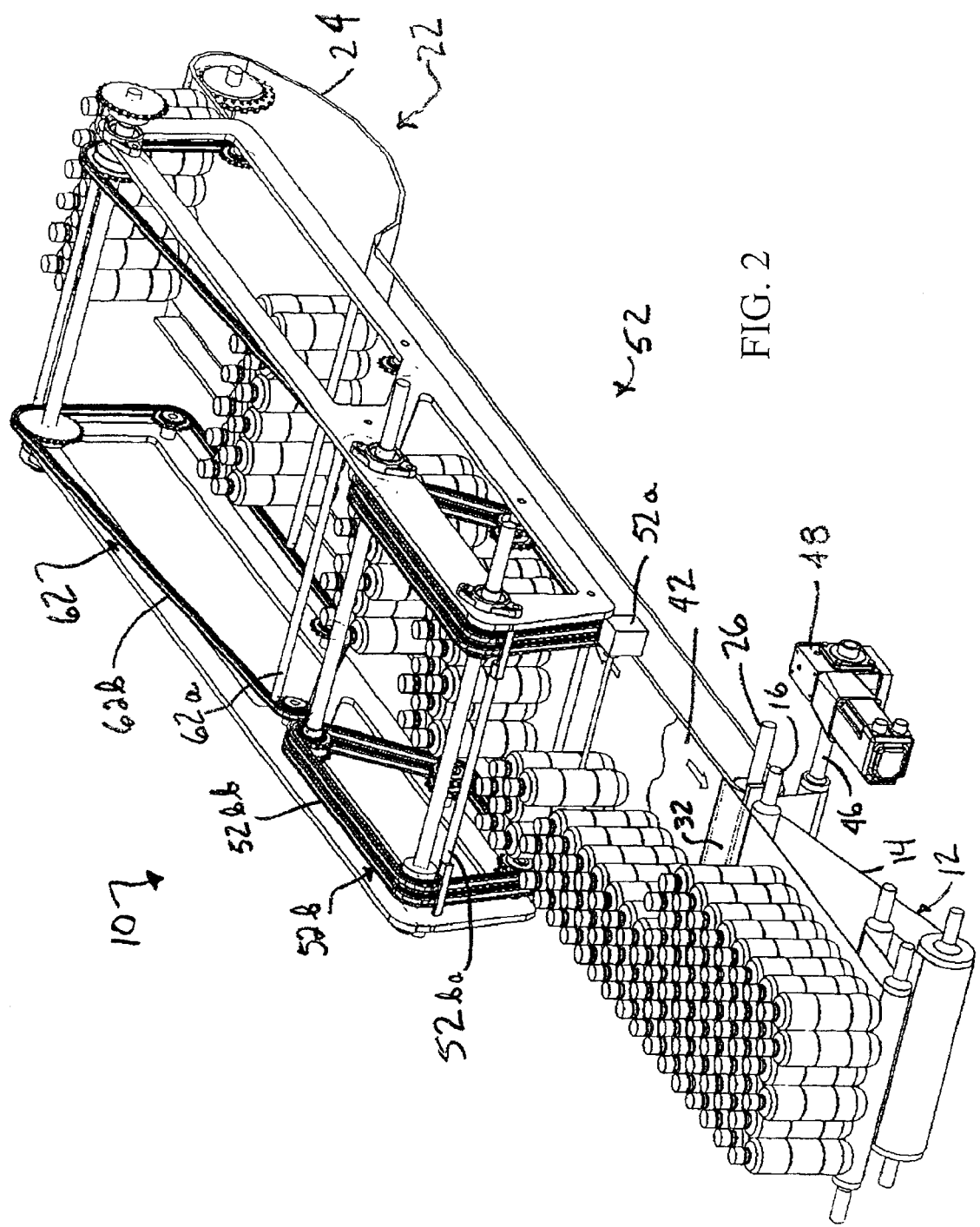

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood.

Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENTS

An apparatus for metering product and in particular to apparatus which collates and separates groups of product in preparation for various types of packaging of the most preferred form is shown in the drawings and generally designated 10. Generally, apparatus 10 includes first and second product conveyance mechanisms which are independently driven for moving product in a conveying direction. In the most preferred form, the conveying direction of the first and second product conveyance mechanisms are colinear to each other, with the product being transferred from the first product conveyance mechanism where they are bunched together unto the second product conveyance mechanism where they are separated, typically into groups. However, it should be recognized that the first and second product conveyance mechanisms could have other arrangements including linearly parallel, perpendicular or at a nesting angle of nested product. In the most preferred form, the first product conveyance mechanism is shown as a meter conveyor 12 which is driven at variable speeds such as by a servo motor. In the preferred form, conveyor 12 includes an endless belt 14 including an upper run extending between an upstream roller and a downstream roller 16. It should be realized that conveyor 12 can include one or more additional rollers, with one or more of the rollers 16 being rotated such as by a servo motor to cause movement of belt 14.

In the most preferred form, the second product conveyance mechanism is shown as a sweep conveyor 22 which is separately driven from conveyor 12 and typically in a continuous manner such as by a servo motor. In the preferred form, conveyor 22 includes an endless belt 24 including an upper run extending between an upstream roller 26 and a downstream roller. It should be realized that conveyor 22 can include one or more additional rollers, with one or more of the rollers 26 being rotated such as by a servo motor to cause movement of belt 24. In the most preferred form, the upper runs of belts 14 and 24 are in the same plane, and possibly the upper run of belt 24 being parallel to but slightly lower than the upper run of belt 14.

Due to the circular cross sections of rollers 16 and 26 in the most preferred form, a gap is created between belts 14 and 24. In the preferred form, a flat, stationary transfer plate 32 extends between the upper runs of belts 14 and 24 generally between the mid point of rollers 16 and 26. Thus, lead product is pushed by the continuous stream being advanced by conveyor 12 onto and past transfer plate 32 in a manner described hereinafter.

Apparatus 10 according to the teachings of the present invention includes a product transfer device 42 upon which product is supported and in the preferred form has an upper surface of a size upon which the bottom of the product is supported and in the most preferred form to receive product having multiple rows and multiple columns. Transfer device 42 is moveable between an extended position and a retracted position. Device 42 extends over conveyor 22 in the extended position and in the preferred form also extends over conveyor 22 beyond transfer plate 32 in the retracted position. In the most preferred form, device 42 is in the form of a thin piece of flexible material such as a belt requiring external support to allow product to be supported thereon. Thus, in the preferred form, device 42 in the form of a thin piece of material engages and is supported by belt 24 to allow product to be supported upon device 42. In the preferred form, device 42 is moved from its extended position to its retracted position by having its upstream end secured to the periphery of a roller 46 which is rotated such as by a servo motor 48. Thus, as roller 46 is rotated, device 42 is wrapped around roller 46 and thereby has a shorter exposed length. In the most preferred form, device 42 is moved from its retracted position to its extended position by movement with belt 24 of conveyor 22 as the result of friction between device 42 and belt 24, with servo motor 48 tending to limit the velocity of device 42 to equal that of conveyor 12. It should be appreciated that device 42 could be moved by other manners including but not limited to by being reciprocated such as by air cylinders or like. Likewise, device 42 could be formed in other manners such as a flat piece of nonflexible material which does not rely upon belt 24 for external support and which could be slid under transfer plate 32 in its retracted position. However, it is believed that the flexible material forming device 42 is advantageous for several reasons including inertia concerns, costs, and the like.

Apparatus 10 according to the teachings of the present invention further includes a control device 52 for registering the leading edge of the product group on transfer device 42 in its extended position. In the most preferred form, device 52 includes a photo eye 52a and/or a metering bar mechanism 52b. Basically, photo eye 52a passes a beam of light across sweep conveyor 22 at the location where the leading edge of the product group on transfer device 42 is in its extended position. When one or more product breaks this light beam, the speed of meter conveyor 12 is adjusted or stopped, with servo motor 48 simply repeating its pattern every cycle in the most preferred form. Thus, photo eye 52a ensures that product is always in the required position when transfer device 42 moves from the extended position to the retracted position and compensates for the potential compressing or inconsistency of product located on device 42.

Metering bar mechanism 52b generally includes a plurality of metering bars 52ba extending laterally across sweep conveyor 22 which are carried along an endless path such as by belts, chains or other transmission device 52bb. Specifically, in a portion of the path, metering bars 52ba move in the conveying direction of conveyor 22 at least initially at the conveyance speed of conveyor 12. Generally, the leading edge of product on sweep conveyor 22 abuts against a respective metering bar 52ba which may serve to prevent tipping of the product upon sweep conveyor 22 as well as to physically restrain product on sweep conveyor 22.

According to the teachings of the present invention, apparatus 10 further includes a mechanism 62 which collects product together and delivers the product to the next appropriate packaging function such as film overwrap or corrugated wrap in a finished form. In the most preferred form, mechanism 62 is a sweeping bar mechanism generally including a plurality of sweep bars 62a extending laterally across sweep conveyor 22 and which are carried along an endless path such as by belts, chains or other transmission device 62b. Generally, sweep bar mechanism 62 is located downstream of metering bar mechanism 52b, with sweep bar 62a being introduced between product on sweep conveyor 22 for abutting with the trailing edge of product on sweep conveyor 22. In the most preferred form, sweep conveyor 22 and sweep bar mechanism 62 are driven together such as by a servo motor.

Now that the basic construction of apparatus 10 according to the preferred teachings of the present invention has been set forth, modes of operation and advantages of apparatus 10 can be explained. Generally, product is fed in a random basis to meter conveyor 12 where it accumulates. In particular, meter conveyor 12 preferably runs constantly but possibly at variable speed, and product is conveyed or pushed thereon. Products can be accumulated on and are conveyed by conveyor 12 as a continuous stream in multiple columns extending laterally across the streams and rows extending longitudinally along the stream or as a lane including a single column and multiple rows in a conveying direction at a first conveyance speed. Additionally, product can have a variety of shapes such as circular or rectangular cross sections. In particular, product can accumulate in a nested manner in the continuous stream on meter conveyor 12 such as in the case of circular cross sections. Nesting of products is very beneficial in apparatus 10 according to the teachings of the present invention as nesting and the lack of physical registration vastly minimizes product surge or in other words the high-pressure effect of one product pushing against another at the point of product release onto transfer device 42.

Products can also accumulate in a non-nested array manner in a single column or lane or in multiple columns. As an example, although the first product conveyance mechanism is shown in the preferred form as a single conveyor 12 in the preferred form, the first product conveyance mechanism could be in the form of parallel, multiple conveyors 12, each conveying a continuous stream of product. Alternatively, the first product conveyance mechanism can be in the form of a single conveyor 12 but with individual lane separator guides being placed over conveyor 12, with such individual lane separator guides being installed permanently or removable and/or adjustable such as by simply being slid to the side for convenient storage for use when desired.

It should be appreciated that in the case of nested or single column product, control device 52 can be in the form of photo eye 52a and metering bar mechanism 52b, if utilized, functions to prevent tipping of the product upon sweep conveyor 22 and/or controls acceleration of product on sweep conveyor 22 from device 42 to keep product together and precisely located on sweep conveyor 22 as it moves to sweep bars 62a. In the case of multiple column, non-nested packages, control device can be in the form of metering bar mechanism 52b which physically registers the leading edges of each of the multiple columns to be the same, with photo eye 52a possibly being eliminated.

For the sake of explanation, it will be assumed that device 42 is in its retracted position and product has been advanced by metering conveyor 12 to the free edge of device 42 or transfer plate 32. Device 42 is moved from its retracted position to its extended position such as by moving servo motor 48 such that device 42 moves and is carried by engaging with belt 24 of conveyor 22 in the conveying direction of conveyor 22. Simultaneously, during, or after device 42 is moved to its extended position, meter conveyor 12 is actuated to move belt 14 to push and thereby transfer product from belt 14 onto transfer plate 32 and onto device 42 in its extended position, with meter conveyor 12 being actuated until photo eye 52a senses product in the case of nested or single column product and/or until product engages a metering bar 52ba. In the latter case, meter conveyor 12 is actuated so that belt 14 travels a set time or distance corresponding to the desired product pattern depth. Generally, after product has been transferred to device 42, device 42 is moved from its extended position to its retracted position, with the product being removed from device 42 by sliding from device 42 onto sweep conveyor 22 as the upstream product on conveyor 12, transfer plate 32 and device 42 abut with the continuous stream of product upon device 42 and thereby prevent product on device 42 from moving in an upstream direction with device 42 as device 42 moves from the extended position to its retracted position. In fact, in the preferred form where meter conveyor 12 constantly advances product, device 42 begins moving from its extended position towards its retracted position before the product intended to be removed reaches the released position over sweep conveyor 22. It should be noted that the distance moved should generally be equal to the desired product pattern depth and specifically a distance so that the last product(s) in the desired group of product are located sufficiently upon belt 24 such that they will travel with belt 24 and thereby are repositioned relative to transfer device 42 by conveyor 22. It should be appreciated that the leading edge of transfer device 42 should be insured to be located between product groups such as electronically by controlling transfer by meter conveyor 12 and/or by controlling servo motor 48 on the amount that transfer device 42 is moved. Alternately, physical registration adjustment is possible by moving control device 52 and/or transfer device 42.

It should be appreciated that product generally is in the same relationship in the group as in the continuous stream. Specifically, there is generally no separation of product in a direction perpendicular to the conveying direction or in other words between the columns and rows. Such separation occurs in prior pin metering apparatus which requires further alignment or railing to get into a compact group. Apparatus 10 according to the preferred teachings of the present invention releases product onto conveyor 22 in a compact group, eliminating the need for further railing. Additionally, an added benefit is that product in groups seem to be more stable than when product stands individually on conveyor 22.

After product transfer device 42 has reached its retracted position, this operation is repeated after a distance gap has been created on belt 24 between the product group previously traveling with belt 24 and the next product still on device 42 and before device 42 is again moved to its extended position. In the most preferred form, sweep conveyor 22 is moving in the same conveying direction as but at a higher velocity than meter conveyor 12 such that the product pattern is accelerated when moved from device 42 onto sweep conveyor 22 to create the physical separation between the product patterns and the contiguous stream of products on meter conveyor 12. This is beneficial as the velocity of meter conveyor 12 can approach being constant if device 42 can be moved from its extended position to its retracted position and again move towards its extended position as the leading product(s) in the continuous stream of product pass from transfer plate 32 after the previous product has passed onto belt 24.

Once product groups have been placed onto sweep conveyor 22 with physical separations between them, the product in the groups can be collected together and placed in a desired pack pattern, if not already so, such as by the use of meter bars 52ba entering ahead of the product groups on sweep conveyor 22 for delivery to the next appropriate packaging function including sweep bar mechanism 62 and such as but not limited to shrink-packing (film only, film and pad, and/or film and tray), tray loading, cartoning, sleeving or case packing.

It should be appreciated that apparatus 10 according to the teachings of the present invention is advantageous for several reasons. First, it is not necessary for the product to have windows between them in the continuous stream as was necessary with pin type metering. Particularly, apparatus 10 of the present invention can be utilized with product which have windows such as but not limited to cylindrical product, such as but not limited to cans, plastic bottles, and jars, product which do not have windows such as but not limited to rectangular parallelepipeds, such as in cartons and boxes, as well as product in the form of bundles or trays Thus, apparatus 10 is able to function with many types of product.

In this regard, it may be desired to manufacture device 42 to have a leading edge which is scalloped to have a shape representing the actual shape of the leading bottom edges of the nested pattern of product to be appropriately deposited onto conveyor 22, with the leading bottom edge of product not being linearly straight such as being circular as in the case of many cans, bottles, jars or the like. The advantage of such a scalloped shape is that the leading edge follows the following edge of the last row of the product group and the leading edge of the continuous stream as the following edge has a forward extent forward of the rearward extent of the leading edge due to the nested arrangement which could result in product being haphazardly released from or carried by device 42 if its leading edge were not scalloped. Although it would be necessary to have devices 42 scalloped to each of the potential nested patterns of products desired to be metered, device 42 can be a replacement part which is especially inexpensive when formed of belting or similar thin, flexible material. Additionally, leading edge of device 42 could have other shapes to help removal of product as transfer device 42 moves from its extended position.

Likewise, to change over to product groups having different group depths such as to change between groups having different product sizes or groups having a different number of rows, it is only necessary to adjust the distance that device 42 moves between its extended and retracted position such as by changing the controls to servo motor 48 in the preferred form, to attach device 42 at a different length to roller 46, or to utilize a different device 42 which can be a relatively inexpensive replacement part. Thus, apparatus 10 according to the teachings of the present invention can be rapidly changed between product and pack pattern type and size.

Apparatus 10 according to the teachings of the present invention facilitates electronic registration such as by the use of photo eye 52a. Electronic registration removes forces of physical registration previously required for pin and other prior design metering, which could be sufficiently large to cause product damage. When physical registration is required utilizing apparatus 10 according to the teachings of the present invention, the forces on the product can be managed by controlling build up of product on conveyor 12.

It should be appreciated that apparatus 10 according to the teachings of the present invention is formed of relatively few moving parts, and the only part which would be subjected to wear is device 42, which in the preferred form is a relatively inexpensive replacement part. In particular, conveyors 12 and 22 and metering bar mechanism 52b, if utilized, are low wear and maintenance especially in comparison to the pin metering conveying mechanisms. Additionally, product is open from the top and generally open from the sides during the metering function of apparatus 10 according to the teachings of the present invention to allow easy access to product on conveyor 12 and/or 22. Likewise, apparatus 10 only requires roller 46 in the preferred form beneath conveyors 12 and 22 (and servo motor 48 to the side) for easy access to the bottom for maintenance and cleaning.

In the most preferred form, conveyor 22 moves at a higher velocity than conveyor 12 so that the product group accelerates from the continuous stream once they are supported directly on conveyor 22. This is advantageous because conveyor 12 can continuously operate without stopping even during the removal of product from transfer device 42 by moving in a direction opposite to the conveying direction of conveyor 12. However, it is possible to have conveyor 12 surge in velocity to transfer product onto device 42 and then decelerate to cause the separation between the metered product group and the continuous stream of product. Likewise, separation could be caused by other techniques including but not limited to combinations of the above.

It should be appreciated that metering bar mechanism 52b performs an additional function according to the preferred teachings of the present invention. Specifically, in the most preferred form, conveyor 22 moves at a velocity greater than the velocity of product before it is transferred onto conveyor 22. As a result, product on conveyor 22 will separate from product still located upon transfer device 42 in the form shown to cause a physical separation therebetween if product was free to accelerate with conveyor 22. Basically, lead product on conveyor 22 initially contacts one of metering bars 52ba generally when transfer device 42 begins moving from its extended position. As metering bars 52ba travel generally at the velocity of product on transfer device 42, metering bars 52ba control the acceleration of product to be less than conveyor 22 so that separation within the group of product does not occur. Once the entire group of product has been transferred from transfer device 42 onto conveyor 22, metering bars 52ba can be accelerated to match the velocity of conveyor 22 or can be slid away from the leading product on conveyor 22 such that product on conveyor 22 is allowed to accelerate to match the speed of conveyor 22.

As set forth previously, apparatus 10 according to the teachings of the present invention allows nesting in the continuous stream which is very desirable. Thus, when separated into groups, product will be nested or will not be in the same physical relationships to each other as when they were in the continuous stream as variations in slippage between individual product in the group and conveyor 22. However, many packaging operations require the product group to be in an arranged pack pattern. According to the teachings of the present invention, metering bars 52ba travel at a velocity slower than conveyor 22 and are in front of the product group to thereby limit acceleration of product. As a result, the product in group will slide on conveyor 22 (possibly with the help of side rails) relative to each other so that they will be located in an arranged pack pattern suitable for further packaging functions when engaged by sweep bars 62a. It should be realized where product is in an arranged pattern and electronic registration is possible using only photo eye 52a, where product does not have to be in a particular pattern, or the like, metering bar mechanism 52b could be simply removed, such as by sliding to a noninterfering position above conveyor 22.

Now that the basic teachings of the present invention have been explained, many extensions and variations will be obvious to one having ordinary skill in the art. For example, although apparatus 10 of the most preferred form includes the combination of several, unique features believed to obtain synergistic results, apparatus could be constructed according to the teachings of the present invention including such features singly or in other combinations.

Additionally, it can be appreciated that conveyor 22 could be arranged to receive a tray or a pad before transfer device 42 is extended thereover or product transferred onto conveyor 22 according to the teachings of the present invention. Forming transfer device 42 from rigid material may be desirable in such instances. However, forming transfer device 42 of a thin piece of flexible material is believed to be advantageous for its low cost, low inertia and ease of adjustment.

The function of plate 32 is to allow product to be transferred from conveyor 12 to conveyor 22. However, it can be appreciated that this function can be accomplished in other manners as well known in the packaging art including but not limited to by the use of roller mechanisms, reshaping conveyors 12 and/or 22, or by utilizing other manners of product conveyance mechanisms. As an example, another possibility is using a moving conveyor transfer that consists of the tail shaft of sweep conveyor 22 and the head shaft of meter conveyor 12 having a fixed relationship to each other and which can laterally position itself (such as via a servo motor) underneath the appropriate product separation point and then in combination with meter bars 52ba advance the desired arrangement of product to conveyor 22.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for metering products comprising:

moving a transfer device from a retracted position to an extended position;

transferring product unto the transfer device;

removing product from the transfer device by moving the transfer device from the extended position to the retracted position after product has been transferred to the transfer device, with product being prevented from moving with the transfer device from the extended position to the retracted position; and repositioning product removed from the transfer device, with transferring product comprising conveying a continuous stream of product which pushes product unto the transfer device, with product being prevented from moving with the transfer device from the extended position to the retracted position by abutting with the continuous stream of product.

2. The method of claim 1 with transferring product comprising transferring product having multiple rows and multiple columns.

3. Method for metering products comprising:

moving a transfer device from a retracted position to an extended position;

transferring product unto the transfer device;

removing product from the transfer device by moving the transfer device from the extended position to the retracted position after product has been transferred to the transfer device, with product being prevented from moving with the transfer device from the extended position to the retracted position; and repositioning product removed from the transfer device, with moving the transfer device comprising moving the transfer device having a leading edge which is scalloped to represent a leading bottom edge of product which is not linearly straight.

4. The method of claim 3 with transferring product comprising transferring product having multiple rows and multiple columns.

5. Method for metering products comprising:

moving a transfer device from a retracted position to an extended position;

transferring product unto the transfer device;

removing product from the transfer device by moving the transfer device from the extended position to the retracted position after product has been transferred to the transfer device, with product being prevented from moving with the transfer device from the extended position to the retracted position; and repositioning product removed from the transfer device, with moving the transfer device comprising moving a thin piece of flexible material.

6. The method of claim 5 with repositioning product comprising moving a first product conveyance mechanism in a first conveying direction, with the transfer device extending over the first product conveyance mechanism in the extended position, with moving the transfer device from the retracted position to the extended position comprising engaging the thin piece of flexible material with the first product conveyance mechanism for moving the thin piece of flexible material by the first product conveyance mechanism in the first conveying direction.

7. The method of claim 6 with moving the transfer device from the extended position to the retracted position comprising wrapping the thin piece of flexible material around a rotating roller.

8. The method of claim 5 with transferring product comprising transferring product having multiple rows and multiple columns.

9. Method for metering products comprising:

moving a transfer device in a movement direction from a retracted position to an extended position;

transferring product unto the transfer device in the movement direction;

removing product from the transfer device by moving the transfer device from the extended position to the retracted position after product has been transferred to the transfer device, with product being prevented from moving with the transfer device from the extended position to the retracted position; and repositioning product removed from the transfer device, with transferring product comprising transferring product having generally cylindrical shapes.

10. The method of claim 9 with transferring product comprising transferring product in the form of bottles.

11. Apparatus for metering products comprising, in combination: a first product conveyance mechanism, with product being conveyed by the first product conveyance mechanism in a first conveying direction; a transfer device moveable between a retracted position and an extended position, with the transfer device extending over the first product conveyance mechanism in the extended position, with product being transferred to the transfer device and being prevented from moving with the transfer device when the transfer device is moved from the extended position to the retracted position so that product slides from the transfer device onto the first product conveyance mechanism for being conveyed in the first conveying direction; and a second product conveyance mechanism, with product in a continuous stream being conveyed by the second product conveyance mechanism in a second conveying direction, with the transfer device moving from the extended position to the retracted position opposite to the second conveying direction, with product being moved in the second conveyance direction onto the transfer device by the second product conveyance mechanism and product on the transfer device abutting with the continuous stream when the transfer device is moved from the extended position to the retracted position.

12. The product metering apparatus of claim 11 with the transfer device being sized to receive product having multiple rows and multiple columns.

13. Apparatus for metering products comprising, in combination: a first product conveyance mechanism, with product being conveyed by the first product conveyance mechanism in a first conveying direction; and a transfer device moveable between a retracted position and an extended position, with the transfer device extending over the first product conveyance mechanism in the extended position, with product being transferred to the transfer device and being prevented from moving with the transfer device when the transfer device is moved from the extended position to the retracted position so that product slides from the transfer device onto the first product conveyance mechanism for being conveyed in the first conveying direction, with the transfer device including a leading edge over which product slides when the transfer device moves from the extended position to the retracted position, with the leading edge being scalloped to represent a leading bottom edge of product which is not linearly straight.

14. Apparatus for metering products comprising, in combination: a first product conveyance mechanism, with product being conveyed by the first product conveyance mechanism in a first conveying direction; and a transfer device moveable between a retracted position and an extended position, with the transfer device extending over the first product conveyance mechanism in the extended position, with product being transferred to the transfer device and being prevented from moving with the transfer device when the transfer device is moved from the extended position to the retracted position so that product slides from the transfer device onto the first product conveyance mechanism for being conveyed in the first conveying direction, with the transfer device being a thin piece of flexible material.

15. The product metering apparatus of claim 14 with the transfer device moving from the retracted position to the extended position in the first conveying direction, with the thin piece of flexible material engaging the first product conveyance mechanism and thereby being moved by the first product conveyance mechanism in the first conveying direction.

16. The product metering apparatus of claim 15 further comprising, in combination: a rotatable roller, with the thin piece of flexible material being secured to the rotatable roller to wrap thereon when the rotatable roller is rotated, with the transfer device being moved from the extended position to the retracted position by the rotation of the rotatable member, with the thin piece of flexible material unwrapping from the rotatable member as the transfer device moves from the retracted position to the extended position.

17. The product metering apparatus of claim 14 with the transfer device being sized to receive product having multiple rows and multiple columns.

18. Apparatus for metering products comprising, in combination: a first product conveyance mechanism, with product being conveyed by the first product conveyance mechanism in a first conveying direction; a transfer device moveable between a retracted position and an extended position, with the transfer device extending over the first product conveyance mechanism in the extended position, with product being transferred to the transfer device and being prevented from moving with the transfer device when the transfer device is moved from the extended position to the retracted position so that product slides from the transfer device onto the first product conveyance mechanism for being conveyed in the first conveying direction; and a photo eye, with the transfer device including a leading edge over which product slides when the transfer device moves from the extended position on the retracted position, with the photo eye sensing when product reaches the leading edge when the transfer device is in the extended position.

19. Apparatus for metering products comprising, in combination: a first product conveyance mechanism, with product being conveyed by the first product conveyance mechanism in a first conveying direction; a transfer device moveable between a retracted position and an extended position, with the transfer device extending over the first product conveyance mechanism in the extended position, with product being transferred to the transfer device and being prevented from moving with the transfer device when the transfer device is moved from the extended position to the retracted position so that product slides from the transfer device onto the first product conveyance mechanism for being conveyed in the first conveying direction; and a metering bar mechanism including at least one metering bar for movement in the first conveying direction along a metering path, with product on the transfer device engaging the metering bar when the transfer device is in the extended position and until the transfer device is in the retracted position.

20. The product metering apparatus of claim 19 with the transfer device being sized to receive product having multiple rows and multiple columns.

* * * * *

UNITED STATES PATENT AND TRADEMARK OFFICE
CERTIFICATE OF CORRECTION

PATENT NO. : 6,843,360 B2
DATED : January 18, 2005
INVENTOR(S) : Thomas Harold Peterman et al.

It is certified that error appears in the above-identified patent and that said Letters Patent is hereby corrected as shown below:

<u>Column 12,</u>
Line 28, delete "on" and insert -- to --.

Signed and Sealed this

Twelfth Day of April, 2005

JON W. DUDAS
*Director of the United States Patent and Trademark Office*